United States Patent
Bellos

(10) Patent No.: US 10,423,047 B2
(45) Date of Patent: Sep. 24, 2019

(54) LASER MACHINING METHOD AND APPARATUS

(71) Applicant: Coherent, Inc., Santa Clara, CA (US)

(72) Inventor: Michael Alexander Bellos, Lebanon, CT (US)

(73) Assignee: Coherent, Inc., Santa Clara, CA (US)

(*) Notice: Subject to any disclaimer, the term of this patent is extended or adjusted under 35 U.S.C. 154(b) by 96 days.

(21) Appl. No.: 15/649,017

(22) Filed: Jul. 13, 2017

(65) Prior Publication Data

US 2018/0031948 A1 Feb. 1, 2018

Related U.S. Application Data

(60) Provisional application No. 62/367,581, filed on Jul. 27, 2016.

(51) Int. Cl.
| | |
|---|---|
| *G02F 1/33* | (2006.01) |
| *B23K 26/082* | (2014.01) |
| *B23K 26/06* | (2014.01) |
| *B23K 26/02* | (2014.01) |

(52) U.S. Cl.
CPC ............... *G02F 1/33* (2013.01); *B23K 26/02* (2013.01); *B23K 26/06* (2013.01); *B23K 26/082* (2015.10); *G02F 2201/34* (2013.01); *G02F 2203/07* (2013.01)

(58) Field of Classification Search
CPC ...... B23K 26/02; B23K 26/06; B23K 26/082; G02F 1/33; G02F 2201/34; G02F 2203/07

See application file for complete search history.

(56) References Cited

U.S. PATENT DOCUMENTS

| | | | |
|---|---|---|---|
| 3,935,419 A | 1/1976 | Lambert et al. | |
| 4,380,694 A | 4/1983 | Dyson | |
| 5,051,558 A | 9/1991 | Sukhman | |
| 6,052,216 A | 4/2000 | Rolfe et al. | |
| 6,563,845 B2 * | 5/2003 | Kumkar | G02F 1/11 359/205.1 |
| 6,576,869 B1 | 6/2003 | Gower et al. | |
| 6,618,070 B2 | 9/2003 | Fischer et al. | |
| 6,697,408 B2 | 2/2004 | Kennedy et al. | |

(Continued)

FOREIGN PATENT DOCUMENTS

| | | |
|---|---|---|
| GB | 2338201 A | 12/1999 |
| WO | 2000/52520 A1 | 9/2000 |
| WO | 2005/121889 A2 | 12/2005 |

OTHER PUBLICATIONS

Chang et al., "Design of a Double-Pass Shear Mode Acousto-Optic Modulator", Review of Scientific Instruments, vol. 79, No. 033104, 2008, pp. 033104-1-033104-5.

(Continued)

*Primary Examiner* — William R Alexander
*Assistant Examiner* — Balram T Parbadia
(74) *Attorney, Agent, or Firm* — Morrison & Foerster LLP

(57) ABSTRACT

A method of delivering a beam of laser-radiation to a workpiece for processing the workpiece comprises transmitting the beam twice through an inactive acousto-optic modulator (AOM) crystal in opposite zero-order directions of the AOM at separate locations on the AOM crystal, before delivering the beam to the workpiece. When laser-radiation is to be blocked from reaching the workpiece, the AOM is activated.

4 Claims, 2 Drawing Sheets

(56) References Cited

U.S. PATENT DOCUMENTS

| | | | |
|---|---|---|---|
| 6,784,399 B2 | 8/2004 | Dunsky et al. | |
| 6,826,204 B2 | 11/2004 | Kennedy et al. | |
| 7,019,891 B2 * | 3/2006 | Johnson | B23K 26/0626 219/121.6 |
| 7,039,079 B2 | 5/2006 | Seguin et al. | |
| 7,058,093 B2 | 6/2006 | Kennedy et al. | |
| 7,113,529 B2 | 9/2006 | Seguin et al. | |
| 7,375,819 B2 | 5/2008 | Courville et al. | |
| 7,453,918 B2 | 11/2008 | Laughman et al. | |
| 7,508,850 B2 | 3/2009 | Newman et al. | |
| 7,675,673 B2 | 3/2010 | Mueller | |
| 7,756,186 B2 | 7/2010 | Chenausky et al. | |
| 7,817,685 B2 | 10/2010 | Osako et al. | |
| 7,903,699 B2 | 3/2011 | Seguin et al. | |
| 8,050,306 B2 | 11/2011 | Seguin et al. | |
| 9,012,851 B2 | 4/2015 | Scherer et al. | |
| 9,414,498 B2 | 8/2016 | Hua et al. | |
| 2002/0048075 A1 | 4/2002 | Kumkar | |
| 2004/0222197 A1 | 11/2004 | Hiramatsu | |
| 2007/0215575 A1 | 9/2007 | Gu et al. | |
| 2007/0280310 A1 * | 12/2007 | Muenter | H01S 3/082 372/28 |
| 2010/0193481 A1 | 8/2010 | Osako | |
| 2010/0301023 A1 * | 12/2010 | Unrath | B23K 26/0648 219/121.67 |
| 2011/0259860 A1 | 10/2011 | Bass et al. | |
| 2012/0138586 A1 | 6/2012 | Webster et al. | |
| 2013/0154159 A1 | 6/2013 | Noel et al. | |
| 2014/0185119 A1 | 7/2014 | Staver | |
| 2014/0231085 A1 | 8/2014 | Zediker et al. | |
| 2014/0352358 A1 | 12/2014 | Washko, Jr. et al. | |
| 2015/0083698 A1 | 3/2015 | Hua et al. | |
| 2017/0050266 A1 | 2/2017 | Mueller et al. | |

OTHER PUBLICATIONS

Donley et al., "Double-Pass Acousto-Optic Modulator System", Review of Scientific Instruments, vol. 76, No. 063112, 2005, pp. 063112-1-063112-6.

Decision to Grant received for European Patent Application No. 14762188.2, dated Nov. 6, 2017, 2 pages.

Intention to Grant received for European Patent Application No. 14762188.2, dated May 9, 2017, 8 pages.

Intention to Grant received for European Patent Application No. 14762188.2, dated Oct. 24, 2017, 6 pages.

International Search Report and Written Opinion received for PCT Application No. PCT/US2016/043627, dated Oct. 20, 2016, 16 pages.

International Search Report and Written Opinion Received for PCT Application No. PCT/US2017/042084, dated Oct. 25, 2017, 10 pages.

International Preliminary Report on Patentability received for PCT Patent Application No. PCT/US2014/053129, dated Mar. 31, 2016, 6 pages.

International Search Report and Written Opinion received for PCT Patent Application No. PCT/US2014/053129 dated Mar. 19, 2015, 10 pages.

Non-Final Office Action received for U.S. Appl. No. 14/830,050, dated Jul. 7, 2017, 9 pages.

Notice of Allowance received for U.S. Appl. No. 14/033,246, dated Apr. 18, 2016, 7 pages.

Notice of Allowance received for U.S. Appl. No. 14/830,050, dated Nov. 24, 2017, 7 pages.

Non-Final Office Action received for U.S. Appl. No. 14/033,246, dated Sep. 17, 2015, 9 pages.

* cited by examiner

LASER MACHINING METHOD AND APPARATUS

PRIORITY CLAIM

This application claims the priority of U.S. Provisional Application No. 62/367,581, filed Jul. 27, 2016, assigned to the assignee of the present invention, and the complete disclosure of which is hereby incorporated herein by reference.

TECHNICAL FIELD OF THE INVENTION

The present invention relates in general to laser-machining and laser processing methods and apparatus. The invention relates in particular to laser-machining methods in which a laser beam for effecting the machining is modulated by an acousto-optic modulator (AOM).

DISCUSSION OF BACKGROUND ART

One commonly used laser-machining (laser-processing) method involves modulating a continuous wave (CW) or pulsed laser-beam using an AOM. Radiation used for the machining is admitted to a workpiece via the AOM at one angle of incidence thereon for effecting the machining, and directed away from the workpiece via the AOM at another angle of incidence thereon during a pause in the machining.

Traditionally, the beam is admitted to the workpiece by the AOM by diffracting the beam at a first-order diffraction angle (direction) of the AOM, and directed away from the workpiece by transmitting the laser-beam through the AOM at a zero-order incidence angle (direction) of the AOM. More recently, however, it has been found advantageous to use the zero-order transmission of the AOM to admit the laser-beam to the workpiece, and the first-order diffraction to direct the laser-beam away from the workpiece.

This latter method is preferred for laser-beams having a relatively broad spectral content, such as beams from carbon monoxide (CO) lasers, as no dispersion of the laser-beam occurs on zero-order transmission. This avoids a need to provide means to correct dispersion before delivering the laser-beam to the workpiece for the machining or processing. A method in which machining is effected by a first order AOM-diffracted beam is described in U.S. Pre-grant Publication No. 20150083698, assigned to the assignee of the present invention, and the complete disclosure of which is hereby incorporated herein by reference. A method in which machining is effected by a zero-order AOM-transmitted beam is described in U.S. Pre-grant Publication No. 20170050266, assigned to the assignee of the present invention, and the complete disclosure of which is also hereby incorporated herein by reference.

Laser-beams used in AOM-modulated laser processing methods are typically plane-polarized, and diffraction by an AOM is polarization sensitive. It has been found in cases where diffraction by the AOM is used to direct a laser-beam away from a workpiece that there is some "leakage" of laser-radiation along the zero-order transmission direction. This has been found to be as much as about 2% of the incident laser-radiation. The leakage can be due to deviation from exact plane-polarization of the laser-beam or by slight misalignment of the polarization-plane with the AOM.

In many applications, such a leakage may be below a threshold value at which a workpiece could be altered or damaged in some way and can accordingly be ignored. In some sensitive applications, however, or in an application where the leakage may strike repeatedly on a workpiece at the same spot, the threshold could be exceeded with negative consequences. There is a need to reduce such leakage, preferably by about an order of magnitude.

SUMMARY OF THE INVENTION

In one aspect, a method in accordance with the present invention for delivering a beam of laser-radiation to a workpiece for processing the workpiece, comprises delivering the beam of laser radiation to an acousto-optic modulator (AOM). The beam is then transmitted through the AOM first and second times, in respectively first and second zero-order directions of the AOM, at respectively first and second separate locations thereon, before delivering the beam of radiation to the workpiece.

The method is applicable to modulating a CW beam for proving a train of laser pulses on the workpiece, or to modulating a beam of laser pulses for temporally shaping the laser pulses.

DETAILED DESCRIPTION OF THE INVENTION

Figure 1:
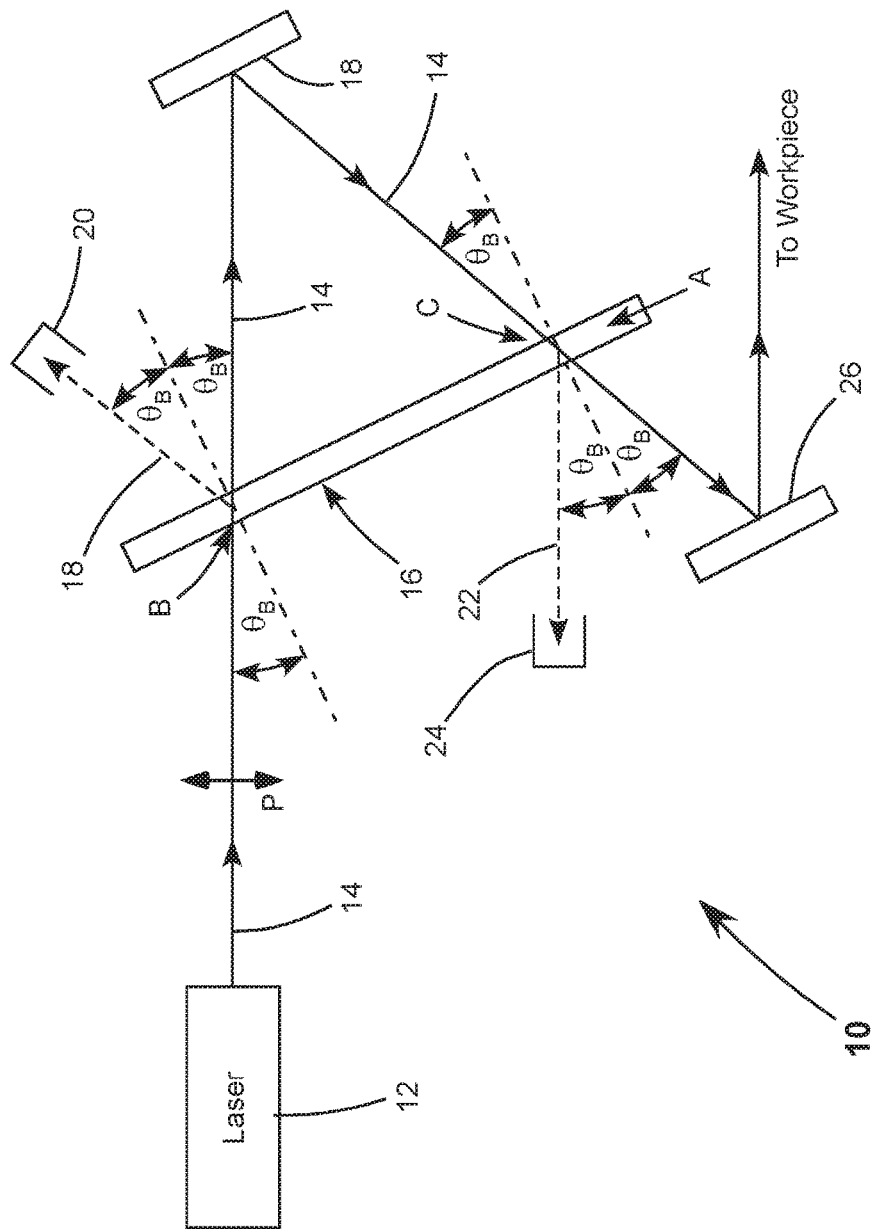
FIG. 1 schematically illustrates one preferred embodiment of laser-machining apparatus in accordance with the present invention including a laser delivering a laser beam and an AOM, with the laser beam being transmitted through AOM in forward and reverse passes in zero-order directions to reach a workpiece, with a single reflector arranged to direct the laser-beam back to the AOM between the forward and reverse passes.

Turning now to the drawings wherein like features are designated be like reference numerals, FIG. 1 schematically illustrates a preferred embodiment 10 of laser-machining apparatus in accordance with the present invention. A laser 12 delivers a beam 14 of laser radiation to be used for the laser machining. An AOM 16 is provided for amplitude modulating beam 14.

AOM 16 is activated by an acoustic wave delivered to the AOM in a direction indicated by arrow A when it is required to interrupt passage of the laser beam to a workpiece not shown. Activation of AOMs is well known in the art to which the present invention pertains. A detailed description of such activation is not necessary for understanding principles of the present invention, and, accordingly, is not presented herein.

Beam 14 is first incident on AOM 16 (at a location B thereon) at an angle $\theta_B$ which is the first order diffraction angle of the AOM when the AOM is activated. When AOM 16 is not activated, beam 14 is transmitted through the AOM along a zero-order direction, i.e., the beam is not diffracted by the AOM, and leaves the AOM at the incidence angle $\theta_B$. Preferably beam 14 is polarized in a direction indicated by double arrow P, parallel to the plane of incidence of beam 14 on the AOM, for minimizing reflection losses on transmission. The first-transmitted beam 14 is directed by a reflector 18 arranged such that beam 14 is again incident on AOM 16 (at a location C thereon) at angle $\theta_B$ and is transmitted a second time through the AOM along a zero-order direction. Twice-transmitted beam 14 is then directed by a reflector 26 past the AOM toward the workpiece. Those familiar with the art will recognize that beam 14 may be incident on beam-directing, beam-shaping or focusing optics before actually being incident on the workpiece.

When it is desired to interrupt passage of beam 14 to the workpiece, AOM 16 is activated by the acoustic wave and the AOM becomes essentially a diffraction grating. At the first incidence of beam 14 on the AOM, a substantial portion of the beam is diffracted along a first diffraction order direction of the AOM as indicated by dashed line 18 is captured by a beam-trap (beam-dump) 20. As the diffraction process is less than 100% efficient, there will be some "leakage" of laser-radiation along the zero-order transmission direction. This can be as much as about 2% of the incident laser-radiation as discussed above.

The leaked radiation proceeds along the beam-14 path and, with AOM still active, the leaked radiation is diffracted again by the AOM in a first diffraction order direction of the AOM as indicated by dashed line 22. The leaked radiation is captured by another beam-dump 22. Again, because of a less than 100% diffraction efficiency, the will be some leakage of leaked radiation long the transmission direction, but this will have less than 0.2% of radiation power first incident on the AOM.

Figure 2:
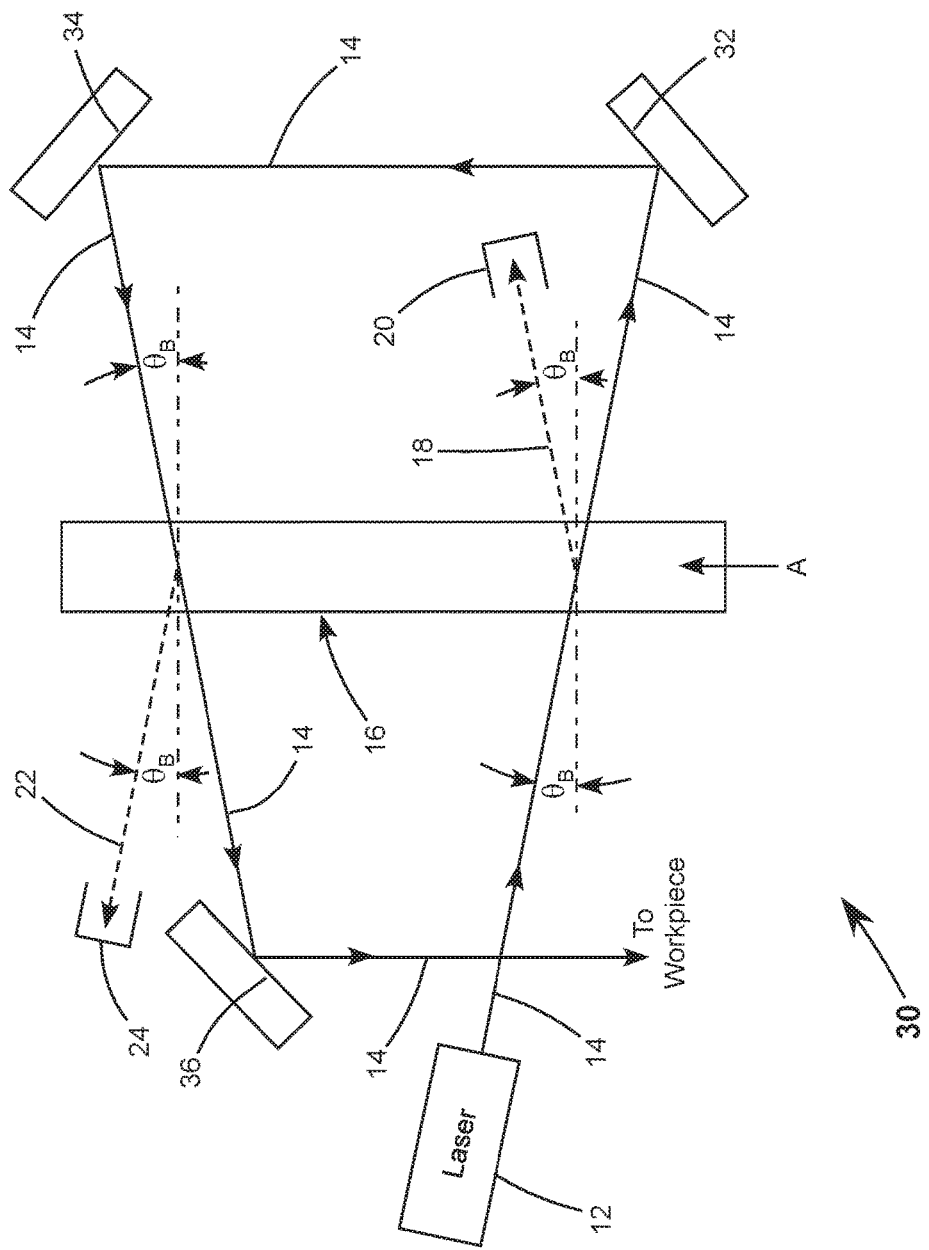
FIG. 2 schematically illustrates another preferred embodiment of laser-machining apparatus in accordance with the present invention, similar to the embodiment of FIG. 1, but wherein two reflectors are arranged to direct the laser-beam back to the AOM between the forward and reverse passes.

FIG. 2 schematically illustrates another preferred embodiment 30 of laser-machining apparatus in accordance with the present invention, similar to the embodiment of FIG. 1, but with exceptions as follows. In apparatus 30 two reflectors 32 and 34 are used to direct first-transmitted beam 14 back to AOM to make a second incidence thereon. A reflector 36 directs a twice transmitted beam 14 back to the workpiece. The effectiveness of apparatus 30 in reducing leaked radiation during interruption of operations on a workpiece is comparable to that of apparatus 10 discussed above.

Those skilled in the art will recognize from the description presented above that the present invention could be used with any wavelength of laser-radiation for which AOMs are available. Those skilled in art the will also recognize that the invention may be used with lasers delivering either continuous wave (CW) or pulsed radiation. Further, while in the embodiments of the present invention described above, first and second zero-order passes through the AOM take place in opposite (forward and reverse) directions, a suitable arrangement of reflector could be used to cause the first and second zero-order passes to occur in the same direction.

In summary, the present invention is described in terms of preferred embodiments. The invention, however, is not limited to the embodiments described and depicted herein. Rather, the invention is limited only by the claims appended hereto.

What is claimed is:

1. A method for delivering a beam of laser-radiation to a workpiece for processing the workpiece, comprising the steps of:
    delivering the beam of laser radiation to an acousto-optic modulator (AOM);
    wherein when the laser radiation is to be directed to the workpiece, transmitting the beam through the AOM first and second times, in respectively first and second zero-order reverse directions of the AOM at respectively first and second separate locations thereon, before delivering the beam of radiation to the workpiece, the AOM being inactive; and
    wherein when the laser radiation is to be diverted from the workpiece, activating the AOM to cause at least a first portion of the laser radiation to be diverted to a first order direction at the first location, said first portion being directed to a first beam dump and wherein at least a second portion of the laser radiation is diverted to a first order direction at the second location, said second portion being directed to a second beam dump.

2. An apparatus for controlling the delivery of a laser beam to a workpiece comprising:
    an elongated acousto-optic modulator (AOM);
    one or more mirrors arranged to direct zero order light transmitted through the AOM at a first location back into the AOM at a second location; and
    an RF power source for activating the AOM, and arranged such that when the AOM is not activated, the laser beam will pass through the AOM on a zero order path from a first side of the AOM to a second side of the AOM at the first location and back through the AOM from the second side AOM to the first side AOM at the second location on a zero order path and thereafter directed to the workpiece, and wherein when the AOM is activated, the majority of the energy of the laser beam transmitted on the first pass through the AOM will be directed into a first order path and to a first beam dump and the majority of the remaining energy of the laser beam transmitted through the AOM on the second pass on the zero order path will be directed into a first order path to a second beam dump.

3. The apparatus of claim 2, wherein the AOM and the one or more mirrors are arranged such that, at the first and second locations, the laser beam is incident on the AOM at a first order diffraction angle of the AOM.

4. The apparatus of claim 2, wherein the laser beam is plane-polarized in an orientation parallel to a plane of incidence of the laser beam on the AOM.

* * * * *